Dec. 27, 1927. 1,653,694
D. E. BRANSON
APPARATUS AND METHOD FOR MEASURING TRANSMITTED LIGHT
Filed Dec. 15, 1923
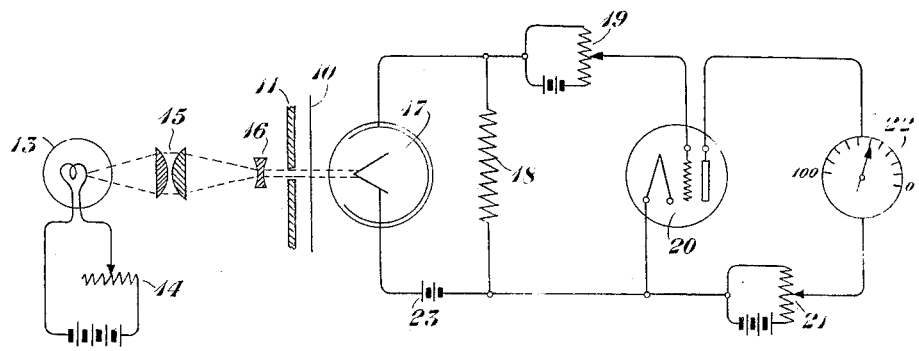
INVENTOR
D. E. Branson
BY
ATTORNEY Patented Dec. 27, 1927.

1,653,694

UNITED STATES PATENT OFFICE.

DAVID E. BRANSON, OF BLOOMFIELD, NEW JERSEY, ASSIGNOR TO AMERICAN TELEPHONE AND TELEGRAPH COMPANY, A CORPORATION OF NEW YORK.

APPARATUS AND METHOD FOR MEASURING TRANSMITTED LIGHT.

Application filed December 15, 1923. Serial No. 681,005.

The principal object of my invention is to provide a new and improved method and appropriate apparatus for measuring the intensity of a beam of light. Another object of my invention is to provide for measuring the transparency of a film at various points thereof. These and other objects of my invention will become apparent on consideration of an example of practice of my invention which I will now proceed to disclose. It will be understood that the invention is defined in the appended claims and that the following disclosure has reference to a particular embodiment thereof.

The drawing is a diagram illustrating this example of practice under my invention.

The source of light 13 may be adjusted in intensity by means of the rheostat 14. The light through the lens system 15—16 produces a parallel beam directed through an opening in the screen 11 and through the underlying spot of the film 10 to the photoelectric cell 17. This cell 17 is in circuit with battery 23 and with the high resistance 18, and in shunt to the latter is the grid of the vacuum tube amplifier 20. 19 is a potentiometer for adjusting the grid voltage. The plate current from the amplifier 20 as determined by the adjustable source 21 goes through the current measuring instrument 22.

As illustrated in the drawings and as here described, the apparatus shown is adapted for measuring the transparency of the film 10. By proper adjustments at 19 and 21, it can readily be arranged that when the light beam is entirely interrupted, that is, when there is a completely opaque spot of the film 10 adjacent to the opening in the screen 11, then the measuring instrument 22 will read zero. Also by adjustment at 14 it can be arranged that when the film 10 is entirely removed, or when a perfectly transparent spot thereof is adjacent to the opening in the screen 11, then the measuring instrument 22 will read at 100.

By well understood principles of amplifier design and adjustment, a linear characteristic for the output current can be obtained, and hence with the film 10 interposed as shown in the drawing, an intermediate reading of the instrument 22 will indicate a corresponding percentage transparency for the spot of the film 10 through which the light passes.

Thus it will be seen that a film 10 which varies from place to place thereof can be readily explored and its percentage transparency can be quickly measured from point to point. In the transmission of pictures by modulated electric currents and by means of semi-transparent films, such an examination of a film with numerical expression of its transparency in various parts may be a very convenient and useful procedure.

The apparatus can also be employed to measure relative intensities of sources of light. With the film 10 removed and with suitable adjustments at 19 and 21, various readings will be obtained at 22 in proportion to the intensity of the light at 13, and by suitable calibration and adjustment the intensity of various sources at 13 can be read off directly at 22.

I claim:

1. The method of investigating the transparency of a picture film by means of a photoelectric cell which comprises producing a beam of light to impinge upon said cell of cross sectional area very small compared with the film area, utilizing the steady current through said cell to set up a steady potential to control an amplifier, utilizing the current in the output of the amplifier to control an indicating device, adjusting the apparatus so that the indicator will pass over a scale range from 0 to 100 when the light from said beam varies between 0 and 100%, and placing the film across said beam so that the latter passes through a small area whereby the percentage of transparency or opaqueness of such area is directly determined.

2. Apparatus for investigating the transparency of a picture film comprising a source of light, means for producing a beam of light therefrom, the cross section of which is small compared with the film area, a photoelectric cell upon which said light impinges, a resistance, means for passing the photoelectric current through said resistance, a space discharge amplifier controlled by the voltage across said resistance, an indicating device in the output circuit of said amplifier, and means to adjust said apparatus so that the indicating instrument will pass over the scale from 0 to 100 when the light from said source upon said cell varies between extreme limits, whereby the percentage of transparency or opaqueness of a spot on the film may be read on said instrument by interposing said spot on the film in said beam.

In testimony whereof, I have signed my name to this specification this 13th day of December, 1923.

DAVID E. BRANSON.